(12) United States Patent
Sukey et al.

(10) Patent No.: US 7,798,502 B2
(45) Date of Patent: Sep. 21, 2010

(54) LUG CART & SUPPORT TABLE ASSEMBLY FOR FOOD PRODUCT BREADING MACHINE

(75) Inventors: Jason Alexander Sukey, Elyria, OH (US); John H. D. LaMarche, II, Vermilion, OH (US); Scott M. Muniga, Oberlin, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 344 days.

(21) Appl. No.: 12/139,087

(22) Filed: Jun. 13, 2008

(65) Prior Publication Data

US 2009/0309321 A1    Dec. 17, 2009

(51) Int. Cl.
*A47B 57/00* (2006.01)

(52) U.S. Cl. ............... 280/47.35; 280/33.991; 280/292; 108/50.01; 108/93; 292/11; 292/109; 292/256

(58) Field of Classification Search ............. 280/47.35, 280/3, 33.991, 33.992, 33.996, 33.997, 651, 280/47.34, 79.11, 79.2, 79.3, 79.5, 288.4, 280/292, 515, 508, 497, 488, 494; 108/50.01, 108/93, 143, 69, 97; 292/11, 24, 95, 109, 292/256; 52/36.1, 36.4, 36.5, 36.6; 248/690, 248/691; 403/323; 4/560.1; 5/628, 81.1 RP, 5/81.1 R; 410/55, 66, 67
See application file for complete search history.

(56) References Cited

U.S. PATENT DOCUMENTS

| | | | |
|---|---|---|---|
| 57,209 A | 8/1866 | Staples | |
| 119,208 A | 9/1871 | Welteck | |
| 180,908 A | 8/1876 | Nelson | |
| 297,822 A * | 4/1884 | Manahan | 248/691 |
| 349,875 A | 9/1886 | Crocker | |
| 499,674 A | 6/1893 | Grossman | |
| 566,197 A | 8/1896 | Link | |
| 617,021 A | 1/1899 | Hunt | |
| 1,597,086 A | 8/1926 | Lutz | |
| 1,817,878 A | 8/1931 | Clements, Jr. | |
| 2,123,687 A | 7/1938 | Wells | |
| 2,243,347 A * | 5/1941 | Klein et al. | 280/494 |
| 2,386,053 A * | 10/1945 | McElhinney | 280/504 |
| 2,419,766 A | 4/1947 | Domash | |
| 2,614,017 A | 10/1952 | Joachim | |
| 2,666,679 A | 1/1954 | Olofsson | |
| 2,676,034 A * | 4/1954 | Tracey | 280/508 |
| 2,696,246 A | 12/1954 | Putnam | |
| 2,722,287 A | 11/1955 | Beinhorn | |

(Continued)

*Primary Examiner*—Paul N Dickson
*Assistant Examiner*—Brodie Follman
(74) *Attorney, Agent, or Firm*—Tarolli, Sundheim, Covell & Tummino LLP (57) ABSTRACT

A lug cart and support table assembly is disclosed comprising a support table having an upper support surface for supporting a breading machine. A lug tub-shaped lug located in the lug cart and a latching system affixed to the lug cart to removably attach the lug cart to a selected one of a front side and a rear side of the table assembly. The latching system includes a first latch assembly and a second latch assembly affixed to an end of the cart in spaced apart relation, each of the first and second latch assemblies includes a support body, a pivoting arm coupled to the support body and pivoting in a horizontal plane about a vertical axis between a locking position and a release position.

16 Claims, 7 Drawing Sheets

U.S. PATENT DOCUMENTS

| | | | | |
|---|---|---|---|---|
| 2,842,380 | A | * | 7/1958 | Weiss .......................... 280/504 |
| 2,988,413 | A | | 6/1961 | Bergen |
| 3,044,197 | A | | 7/1962 | Cook |
| 3,181,253 | A | | 5/1965 | Candreva et al. |
| 3,261,650 | A | * | 7/1966 | Borje ......................... 312/236 |
| 3,869,052 | A | * | 3/1975 | Leahy ........................ 414/401 |
| 3,984,117 | A | * | 10/1976 | Bates et al. .................... 410/66 |
| 4,108,464 | A | * | 8/1978 | von Allworden et al. .... 280/508 |
| 4,279,453 | A | | 7/1981 | Haas |
| 4,507,010 | A | * | 3/1985 | Fujiya ...................... 403/322.1 |
| 4,743,040 | A | * | 5/1988 | Breveglieri et al. ...... 280/47.35 |
| 4,893,885 | A | | 1/1990 | Borello |
| 5,004,387 | A | * | 4/1991 | Jensen et al. .................. 410/69 |
| 5,224,812 | A | * | 7/1993 | Oslin et al. ................... 414/401 |
| 5,312,122 | A | * | 5/1994 | Doty ........................ 280/33.992 |
| 5,387,063 | A | * | 2/1995 | Napierkowski et al. ....... 410/67 |
| 5,441,117 | A | * | 8/1995 | Fartmann et al. ............. 172/272 |
| 5,553,986 | A | * | 9/1996 | Napierkowski et al. ..... 414/401 |
| 5,570,988 | A | * | 11/1996 | Gallaway et al. ............ 414/498 |
| 5,666,887 | A | | 9/1997 | Grabowski et al. |
| 5,862,761 | A | * | 1/1999 | Moore ........................ 108/92 |
| 5,918,892 | A | * | 7/1999 | Aaron et al. .............. 280/47.38 |
| 6,003,452 | A | | 12/1999 | Moore |
| 6,073,942 | A | * | 6/2000 | Heneveld, Sr. ......... 280/33.991 |
| 6,086,315 | A | * | 7/2000 | Poindexter et al. .......... 414/549 |
| 6,244,170 | B1 | | 6/2001 | Whited |
| 6,357,064 | B1 | * | 3/2002 | Totsky ........................... 5/86.1 |
| 6,364,326 | B1 | * | 4/2002 | Reiland et al. ......... 280/33.993 |
| 6,702,313 | B2 | * | 3/2004 | Forshee et al. ........... 280/304.1 |
| 6,877,828 | B2 | * | 4/2005 | Strong ..................... 312/249.8 |
| 7,044,498 | B2 | * | 5/2006 | Chen .......................... 280/642 |
| 7,225,883 | B2 | * | 6/2007 | Yamada et al. .............. 172/272 |
| 7,278,615 | B2 | * | 10/2007 | Schubert et al. .......... 248/125.2 |
| 7,338,097 | B2 | * | 3/2008 | Marzolf et al. .............. 292/216 |
| 7,357,398 | B2 | * | 4/2008 | O'Connor ................ 280/47.34 |
| 7,610,864 | B2 | * | 11/2009 | LaMarche, II et al. ........ 108/93 |
| 7,648,147 | B2 | * | 1/2010 | Lauer et al. .............. 280/47.35 |
| 7,722,058 | B2 | * | 5/2010 | Giampavolo ........... 280/33.991 |
| 2006/0032384 | A1 | | 2/2006 | Muniga et al. |
| 2007/0245905 | A1 | * | 10/2007 | LaMarche et al. ............. 99/494 |
| 2009/0226287 | A1 | * | 9/2009 | Keller ................... 414/226.04 |
| 2009/0266274 | A1 | * | 10/2009 | Berlin et al. ................... 108/6 |

\* cited by examiner

LUG CART & SUPPORT TABLE ASSEMBLY FOR FOOD PRODUCT BREADING MACHINE

TECHNICAL FIELD

The present disclosure relates to a lug cart and support table assembly for use with food processing equipment and, more particularly, a lug cart and support table assembly for supporting one or more food product breading machines, a lug cart assembly adapted for releasably docking to the support table assembly wherein the lug cart assembly includes a latching system for releasably locking the lug cart assembly from a selected one of a front and rear side of the support table assembly.

BACKGROUND

Food product breading machines are widely used in restaurants and food processing industry to coat food items such as chicken tenders, fish filets, onion rings, etc., with breading and/or batter prior to frying or baking the items. An example of a food product breading machine is disclosed in U.S. Pat. No. 6,244,170, issued on Jun. 12, 2001 to Whited. The '170 patent is assigned to the assignee of the present invention and is incorporated herein in its entirety by reference. The '170 patent discloses a breading/battering machine that provides a battering unit disposed vertically above breading unit. The product follows a generally horizontal C-shaped path. The raw product is input at a first end of the machine and moves generally horizontally through the upper battering unit toward an opposite, second or back end of the machine. After completion of battering the product is conveyed downwardly to the breading unit. The product moves generally horizontally through the breading unit back toward the first end where the finished product is discharged from the machine.

Another food product breading machine is disclosed in U.S. patent application Ser. No. 11/235,299, filed Sep. 26, 2005 to Muniga, Whited & Bettcher. The '299 application is also assigned to the assignee of the present invention and is incorporated herein in its entirety by reference. The '299 application discloses a high volume breading/battering machine having two parallel breading/battering units driven by a drive unit positioned between the two units.

Generally, breading machines are placed on a flat support table. The finished products are discharged into a breading lug, commonly referred to in the industry as a lug or bus tub, positioned near a product discharge or first end of the breading machine. Depending on the food item being processed, a perforated metal basket may be supported within the lug with the finished product being discharged into the basket. This may be done, for example, so that excess breading or grease may drip off the finished product falling through openings in the basket into the lug as the finished product sits in the basket.

Typically, the lug is placed in a lug cart which can be wheeled from the breading machine when the lug is full or sufficient finished product has been produced by the breading machine. Additionally, at periodic intervals, the breading machine must be cleaned which involves cleaning out the breading in a breading reservoir of the breading unit. Typically, access to the breading reservoir is from a second or back end of the breading machine. Again, a lug placed in a lug cart is used to catch the breading during the cleaning operation.

The support table poses a number of difficulties. The table must be sturdy enough to support the significant weight of the breading machine. In breading machines used in restaurants, space is typically very limited and the breading machine will be placed with the second or back end against a wall. When cleaning the machine, the support table (with the breading machine positioned on the table) must be pulled away from the wall to access the back end of the machine. Pulling a table across the floor stresses the legs of the table.

Utilizing the lug carts is also problematic. The lug carts are often top heavy and pose a tipping hazard. Because the carts are wheeled, they also tend to move easily when bumped or jostled or simply from vibration of the breading machine. If the cart moves with respect to the support table, finished product can miss the lug and fall onto the floor, thereby increasing waste and posing a slipping hazard. Further, when a lug is full, an employee has to bend over and remove the lug from the cart. This exposes the employee to back strain from lifting a heavy lug from the low height of the cart. Finally, lug carts do not provide a surface surrounding the lugs to direct material into the lug. This is especially problematic with respect to cleaning out the breading from the breading machine. Because the support table is generally wider than the lug and the lug cart, breading often spills from the machine and table over the sides of the lug and the lug cart resulting in breading falling on the floor and causing an unsanitary work area. Employees sometimes improvise with a sheet pan propped against the back end of the breading machine to direct the breading from the machine to the lug, which requires additional work and slows the cleaning process. Additionally, the sheet pan then also has to be cleaned and stored.

SUMMARY

The present invention concerns a lug cart and support table assembly for a food product breading machine. In one aspect, the present invention concerns a support table having an upper support surface for supporting a breading machine; a lug cart supporting a tub-shaped lug; and a latching system affixed to the lug cart to removably attach the lug cart to a selected one of a front side and a rear side of the support table; in a first position of the lug cart, the lug cart being removably attached by the latching system to a pair of front legs of the support table and, in the second position of the lug cart, the lug cart being removably attached by the latching system to a pair of rear legs of the support table.

In one exemplary embodiment, the latching system includes a first latch assembly and a second latch assembly affixed to an end of the lug cart in spaced apart relation, each of the first and second latch assemblies includes a support body, a pivoting arm coupled to the support body and pivoting in a horizontal plane about a vertical axis between a locking position and a release position, the pivoting arm including first and second openings and an arcuate engagement face to engage a portion of a respective leg of the support table in a locking position, and a locking pin extending through the support body and including a distal end extending beyond the support body and received into a selected one of the first and second openings, the locking pin distal end being received into the first opening of the pivoting arm in the locking position, the locking pin distal end pin distal end being received into the second opening of the pivoting arm in the release position.

In one exemplary embodiment, the first and second latch assemblies are in a locking position, for each of the first and second latch assemblies, an arc, facing in a direction of the support body, defined by a first point of contact between the lug cart and a respective leg of the support table and a second point of contact between the pivoting arm and the respective leg being less than 180 degrees such that if one of the first and second latch assemblies is in the locking position and the other of the first and second latch assemblies is in the release position, the lug cart may detached and moved away from the support table.

These and other objects, advantages, and features of the exemplary embodiment of the invention are described in detail in conjunction with the accompanying drawings.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals refer to like parts unless otherwise described throughout the drawings and in which.

DETAILED DESCRIPTION

The present invention relates to a lug cart and support table assembly for use with food processing equipment and, more particularly, a support table assembly for supporting one or more breading machines and a lug cart assembly adapted for releasably docking to a selected one of a front side and a rear side of the support table assembly.

When the lug cart assembly is docked or locked to the front side of the support table assembly, the lug cart assembly is positioned to receive finished breaded products from a product discharge of first end or ends of the one or more breading machines. When the lug cart assembly is docked or locked to the rear or back side of the support table assembly, the lug cart assembly is positioned to receive used breading discharge from a breading reservoir of the one or more breading machines during a cleaning operation. The discharge from the breading reservoir is from a back end of the breading machine opposite the product discharge end. Convenient docking and undocking of the lug cart assembly from either the front or rear sides of the support table assembly is advantageously provided by a latching system of the lug cart assembly.

Lug Cart Assembly

Figure 1A:
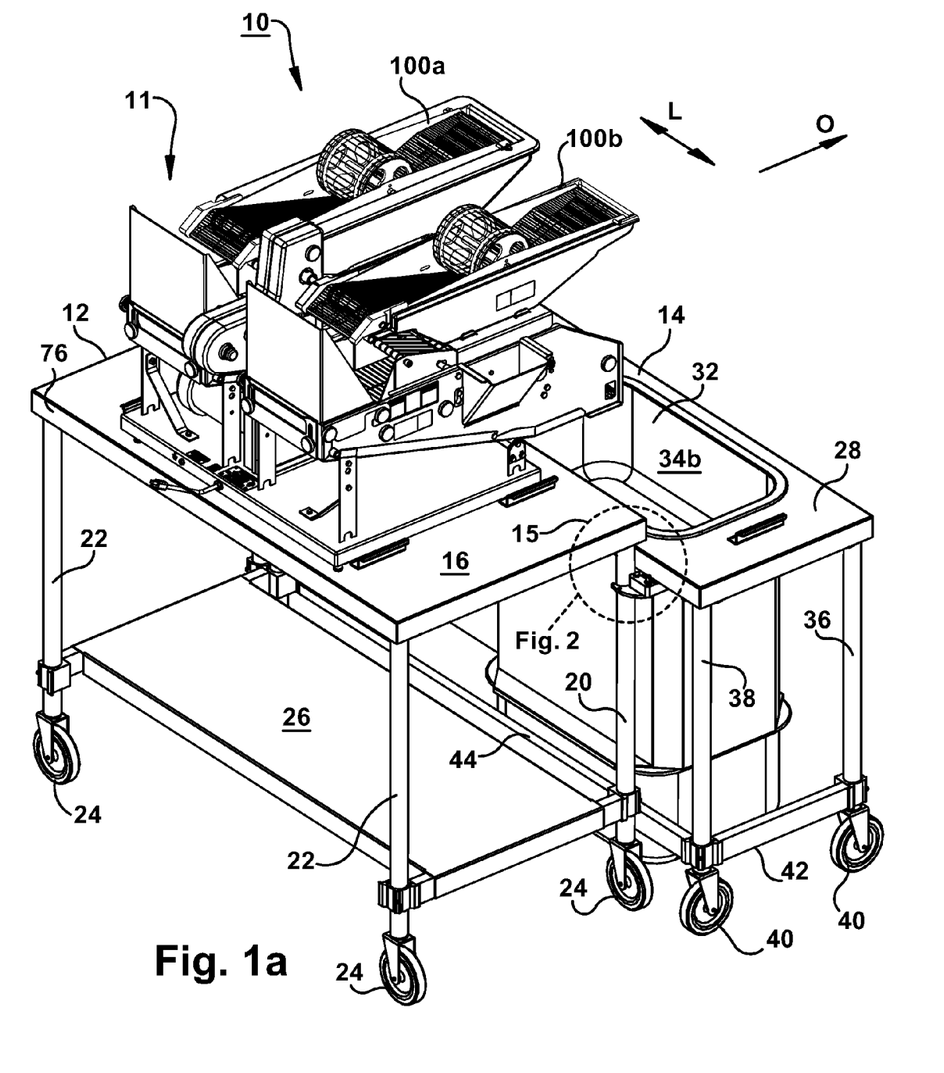
FIG. 1a is a perspective view of a breading system including a lug cart assembly attached to a support table for supporting a food product breading machine constructed in accordance with one embodiment of the present disclosure.
Figure 1B:
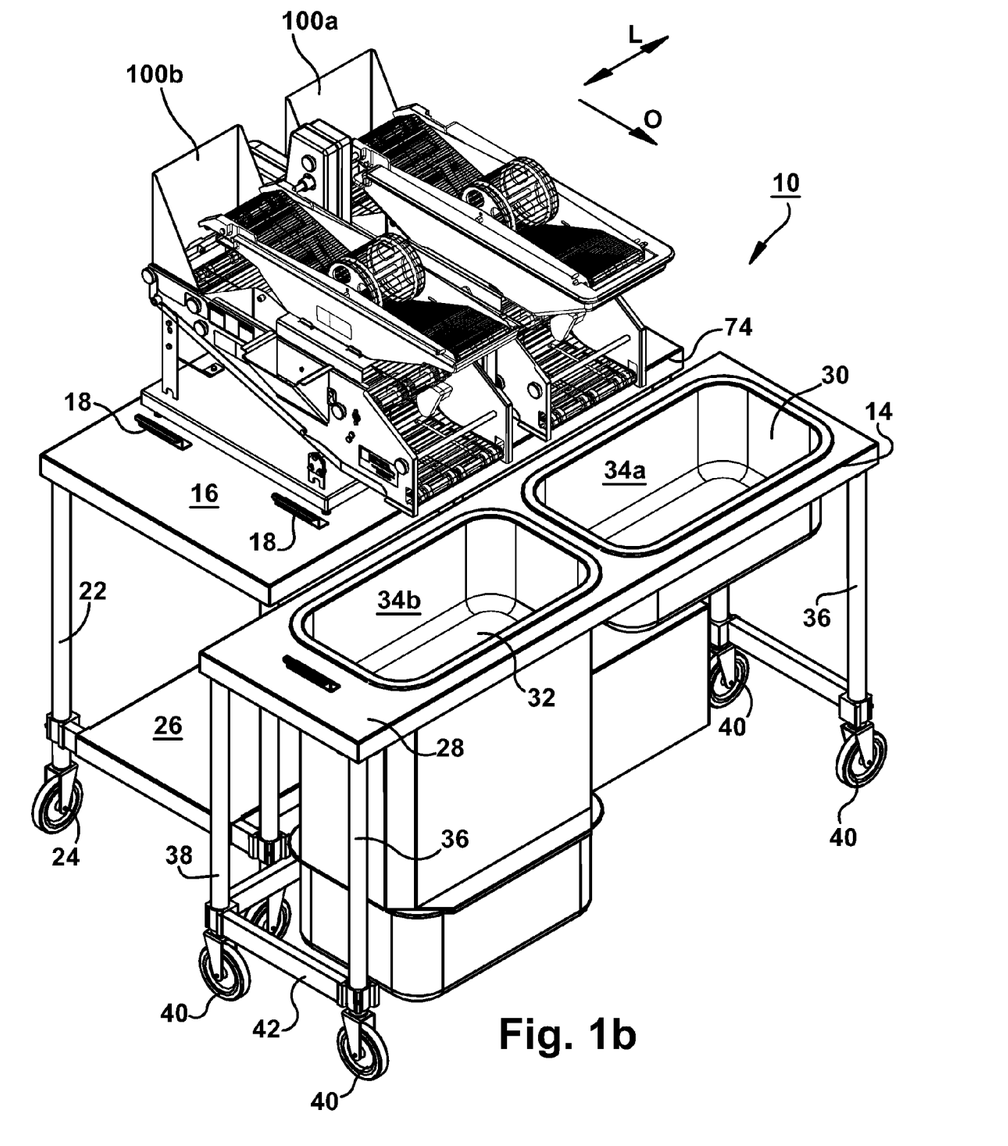
FIG. 1b is a second perspective view of a breading system of FIG. 1a, including a lug cart assembly attached to a support table for supporting a food product breading machine constructed in accordance with one embodiment of the present disclosure.

Referring now to the Figures, and in particular to FIGS. 1a and 1b, a breading system 10 comprising the lug cart and support table assembly 11 of the present invention is shown. The lug cart and support table assembly 11 includes the support table assembly 12 and the lug cart assembly 14. The lug cart assembly 14 includes the latching assembly 15 to releasably attach the lug cart assembly 14 to the support table assembly 12. The support table assembly 12 is adapted to support one or more food product breading machines 100a, 100b. While the lug cart assembly 14 is described as being used with a food product breading machine, the lug cart assembly can be used with any food processing equipment without departing from the spirit and scope of the claimed invention.

Support Table Assembly

The support table 12 comprises a support or mounting surface 16 for supporting the breading machines 100a, 100b, along with a plurality of flanges 18 for securing sheet pans (not shown) to the mounting surface 16.

Extending downward from the underside of the support table 12, and more specifically, mounting surface 16 are pair of first legs 20 and second pair of legs 22. In the illustrated embodiment of FIGS. 1a and 1b, the support table assembly 12 is adapted for movement by the attachment of a caster 24 to each of the pair of legs 20, 22, respectively. The casters 24 can be any combination of locking, unlocking, swivel, or non-swivel as best suited for the environment and/or application.

In an alternative embodiment, the support table assembly 12 is stationary such that the legs 20, 22 extend to the ground without casters 24. The support table assembly 12 in the illustrated embodiment of FIGS. 1a and 1b further comprises a shelf 26 for storing various containers just below the mounting surface 16. The shelf 26 is fixedly attached to first and second pairs of legs 20, 22, providing support and stability to the support table assembly 12.

The lug cart assembly 14 includes an operating surface 28 that in the illustrated embodiment of FIGS. 1a and 1b comprises first and second openings 30 and 32, respectively. Installed within the first and second opening 30, 32, are support lugs 34a, 34b, sometimes referred to as breading lugs or bus tubs and are tub-shaped containers, normally fabricated of high impact plastic that receive finished products from the food processing equipment, and in the illustrated embodiment from a food product breading machine. The support lugs 34a, 34b are aligned with a corresponding conveyor of the breading machine 100a, 100b that transport the finished products such that the products are received in the respective lugs without contacting the edge of the support table 12.

Extending downward from the underside of lug cart assembly 14, and more specifically, the operating surface 28 are pair of first legs 36 and pair of second legs 38. In the illustrated embodiment of FIGS. 1a and 1b, the lug cart assembly 14 is adapted for movement by the attachment of a caster 40 to each of the pair of legs 36, 38, respectively. The casters 40 can be any combination of locking, unlocking, swivel, or non-swivel as best suited for the environment and/or application. Adding support and stability to the lug cart assembly 14 legs are longitudinal braces 42 that connect pair of first legs 36 to the second pair of legs 38. Support and stability is further added by a lateral brace 44 that provides a connection between the pair of second legs 38, as best seen in FIG. 1a.

Latching Arm Assembly

Figure 2:
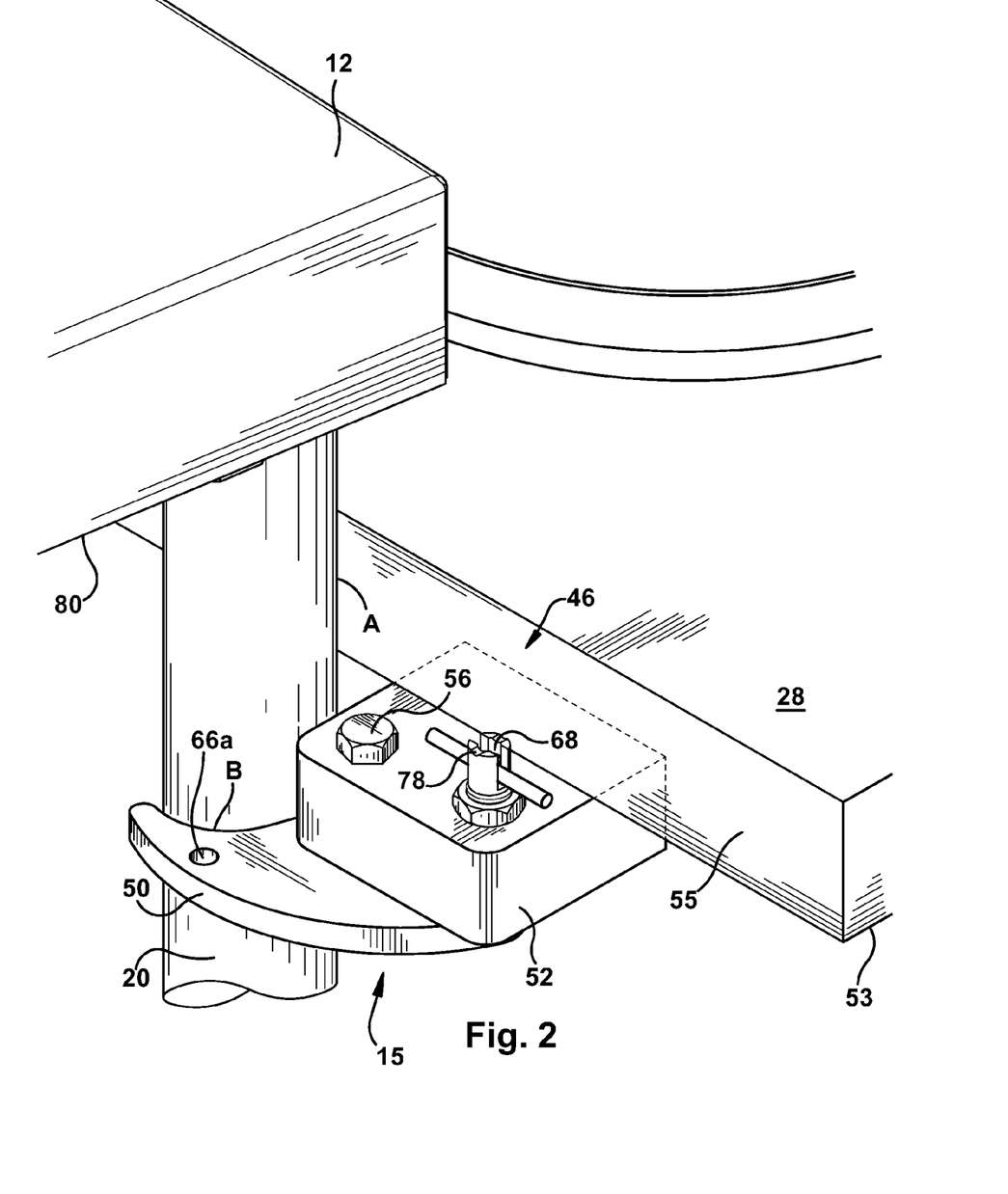
FIG. 2 is a magnified perspective view of latching arm assembly of a latching system of the lug cart assembly secured to a leg of the support table assembly of FIGS. 1a and 1b.
Figure 3:
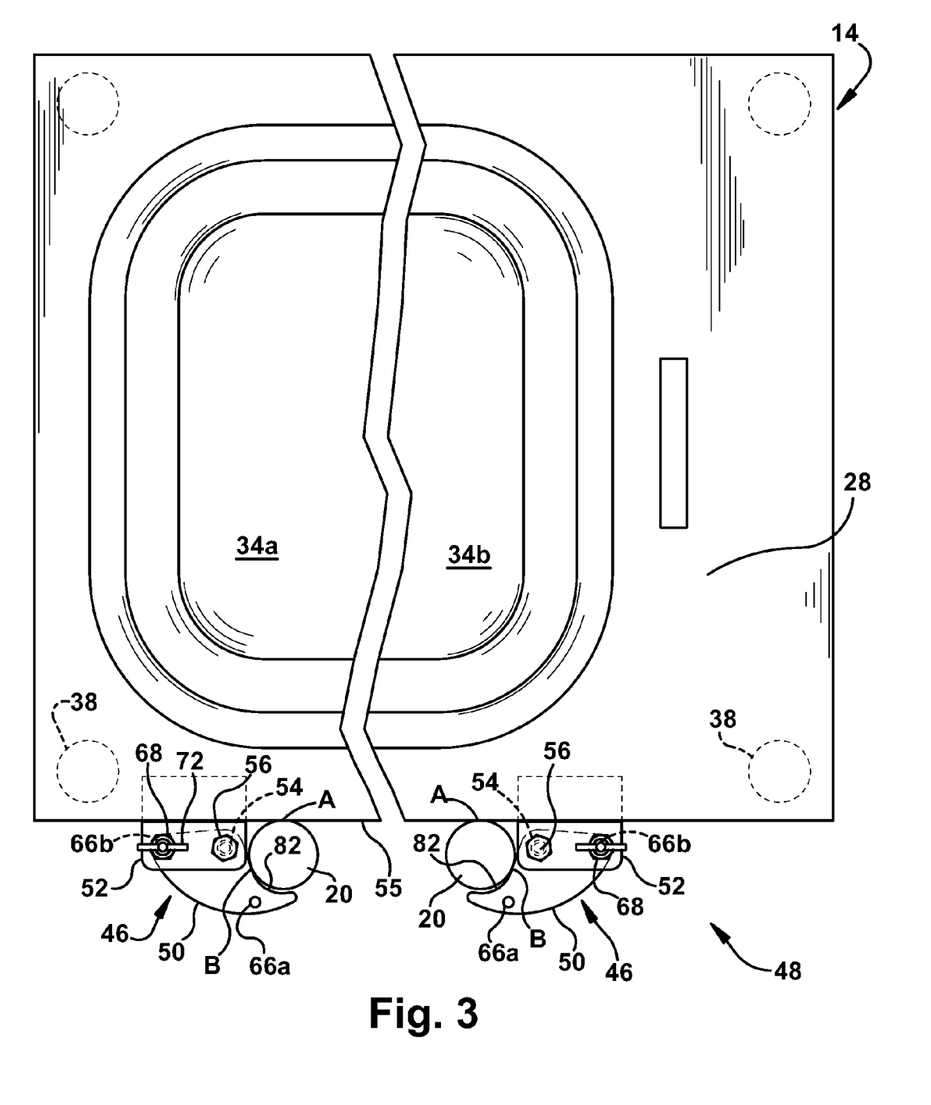
FIG. 3 is a top plan view of the lug cart assembly constructed in accordance with one embodiment of the present disclosure having a latching system comprising first and second latching arm assemblies secured to legs of a support table assembly of FIGS. 1a and 1b.

Illustrated in FIG. 2 is a magnified perspective view of one latching arm assembly 46 of a latching system 48 comprising a pair of latching arm assemblies fixedly attached to the lug cart assembly 14, as better seen in the plan view of FIG. 3. The plan view of FIG. 3 further shows latching assemblies 46, forming a mirror image of each other in a secured docked position around first pair of legs 20 of the support table 12. The mirror image construction of spaced latching assemblies 46 facilitates a one-step release process, further discussed below in more detail. While the illustrated embodiment of FIGS. 1-3 depicts the latching system 48 being attached to the pair of first legs 20 of the support table 12, the latching assembly 48 is equally capable of attaching the lug cart assembly 14 to the pair of second legs 22 of the support table.

Figure 6:
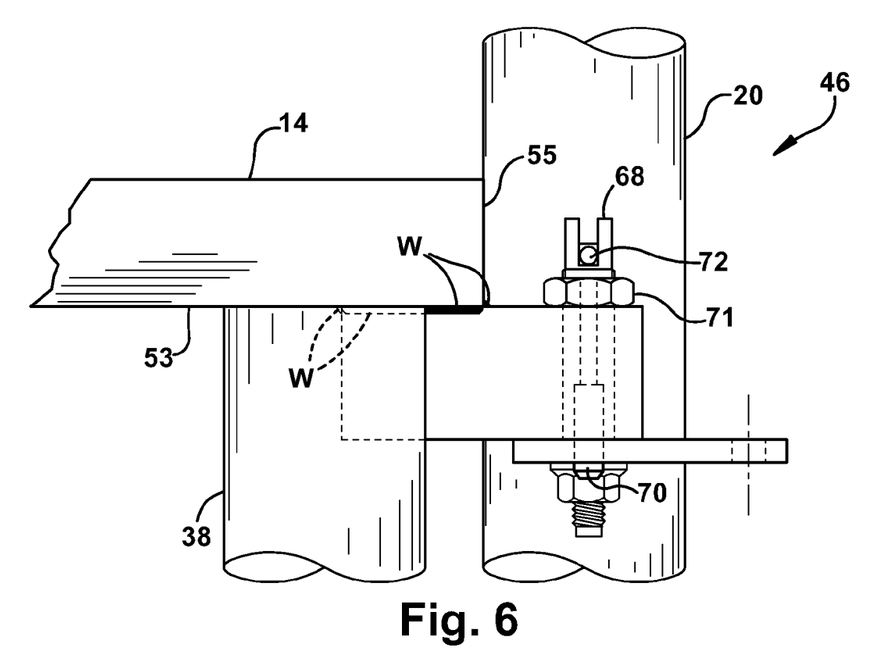
FIG. 6 is a partial-side elevation view of one latching arm assembly of the lug cart of FIG. 3.

The latching assemblies 46 each include an arcuate pivoting arm 50 rotatably connected and horizontally extending from a support body 52. The support body 52 includes a pivot opening 54 and a pivot pin 56 which extends into a pivot aperture 60 located in the arcuate pivoting arm 50 about which the arm rotates to latched or secured positions illustrated in FIGS. 1-3 and 5-6 to an unlatched or unsecured position illustrated in FIG. 4. The rotation of the arcuate pivoting arm 50 is further facilitated by bushings 62, 64, located in the arm 50 and support body 52, respectively. The support body 52 is secured to the lug cart 14 by a plurality of welded connections ("W") (see FIG. 6) to the underside 53 and front 55 of operating surface 28, but could also be secured by any known attachment process, including for example, conventional threaded fasteners.

In the illustrated embodiment of FIGS. 1-7, the pivoting pin 56 is a threaded fastener such as a shoulder bolt, but could equally be any other type of known pivoting connection, including for example, a dowel pin, and the like. The arcuate pivoting arm 50 further comprises locating apertures 66 that assist in holding the pivoting arm 50 in position when rotating is not desired by the passing of a locking pin 68 through the locating apertures 66. The locking pin 68 is held into position by a threaded connection formed by a tapped opening 69 in the support body 52. A locking nut 71 is advanced downward toward and onto the surface of the support body 52 on the locking pin 68 once the pin is oriented at its desired height. A first locating aperture 66a is engaged by the locking pin 68 when the arcuate pivoting arm 50 is rotated to an unlatched or released position illustrated in FIG. 4. A second locating aperture 66b is engaged by the locking pin 68 when the arcuate pivoting arm 50 is rotated to a latched or secure position illustrated in FIGS. 1-3 and 5-6.

Figure 7:
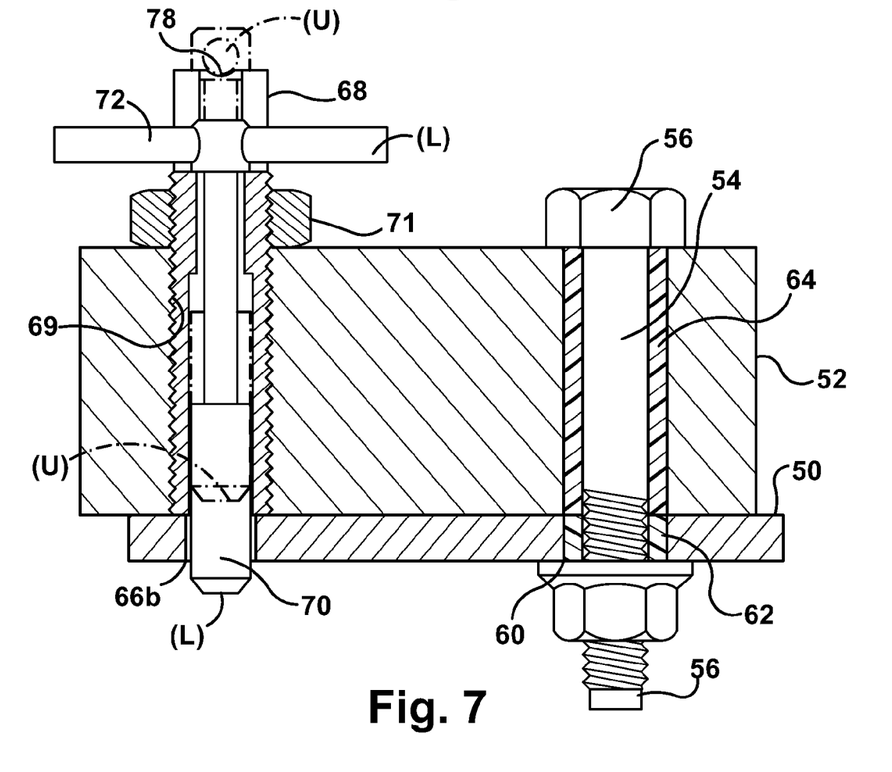
FIG. 7 is a sectional-front elevation view of one latching arm assembly of the lug cart of FIG. 3.

In the illustrated embodiment of FIGS. 1-7, the locking pin 68 is a spring plunger pin, having a spring biased nose or engagement portion 70 at a distal end of the locking pin that is retractable by pulling a T-handle 72 at an end of the locking pin opposite the distal end. The nose 70 is normally biased by a spring (not shown) internal to the spring plunger locking pin 68 such that the nose is in contact with the arcuate pivoting arm 50 and passes through either of the locating apertures 66a, 66b, when aligned with the pin. The various positions of the locking pin 68 are best seen in FIG. 7 in which the pin is in a locking position ("L"), spring biased to pass through one of the locating apertures 66b of the arcuate pivoting arm 50 for a latching condition and similarly is spring biased to pass through locating aperture 66a of the arm for an unlatching condition. The locking pin 68 is further shown (in phantom) in an upward unlocking position ("U") such that the arcuate pivoting arm 50 can freely rotate about pivoting pin 56 to latched and unlatched positions. The upward unlocking position (U) is achieved by the operator engaging the T-handle 72 and pulling the locking pin 68 upward when its desired to move the arcuate pivoting arm to a latched or unlatched position. The T-handle 72 is adapted to remain in the upward (U) position absent assistance by the user by rotating the T-handle 90 degrees and releasing it into a ridge 78.

While any rigid plastic, polymers, or metals could be used for the construction and components of the lug cart assembly, the components in the illustrated embodiment are made from 300 and 400 series stainless steel to help resists corrosion during steam and pressure washing conditions. The spring plunger 68 is a known mechanical fastener available through, for example, MSC Industrial Supply of Melville, N.Y. under part number 62124391 made from 300 series stainless steel approximately two (2") inches in overall length and having a three-eighths of an inch (⅜") bolt diameter at 16 threads-per-inch, ⅜-16, and is available online at micdirect.com.

Docking and Undocking of the Lug Cart Assembly

In operation, the lug cart assembly 14 is advanced by a user for a latching connection with a support table 12 by the latching system 48 of the present disclosure. More specifically, first and second latching arm assemblies 46 for attaching to the pair of first legs 20 on a front side 74 of the support table 1 2 (see FIGS. 1a and 1b). Alternatively, the latching arm assemblies 46 can be spaced apart such that the latching arm assemblies 46 can attached to a rear side 76 of the support table 12 to the pair of second legs 22. As the lug cart assembly 14 is advanced, the operating surface 28 assumes an unobstructed position beneath the underside 80 of the mounting surface 16 of the support table 12 (as best seen in FIG. 2) until the front side 55 of the cart 14 engages the first pair of legs 20 to form a first contact point ("A"). The arcuate pivoting arms 50 of both arm assemblies 46 are then rotated about their respective pivot pins 56 to form second respective contact points ("B") between the inner arcs 82 of the arms. The latching pin 68 is then released to the locked position (L) such that the nose 70 extends through the locating aperture 66b of the arcuate pivoting arm 50, thereby completing the formation of a latched or docked position of the lug cart 14 with the support table 12.

In yet another embodiment, the latching arm assemblies 46 are oversized such that the inner arc 82 or front side 55 of the lug cart 14 do not necessarily form simultaneous contact at point A and point B, but may engage only at one point A or B, or neither point. Instead the legs 20 or 22 are surrounded by the latching arm assemblies 46 prevent substantial movement from the support table 12. Substantial movement includes any movement that would prevent the food products from falling into the lugs 34a or 34b.

The process for undocking or releasing the lug cart assembly 14 from the support table 12 can advantageously be achieved by unlocking only one of the two latching assemblies 46. As such, the operator reduces the time and effort of walking to both ends of the lug cart assembly 14. The current design of the latching assemblies 46 and in particular, the subtended construct of the inner arc 82 of the arcuate pivoting arm 50 (see FIG. 3) and the respective leg 20 or 22 of the support cart that form contact points (A) and (B) are less than 180 degrees, allowing only one of the two latching assemblies 46 to be released for the lug cart assembly 14 to move. This one-step release process is further facilitated by the face-to-face or mirror image of the latching arm assemblies 46 as depicted in FIG. 3.

Figure 4:
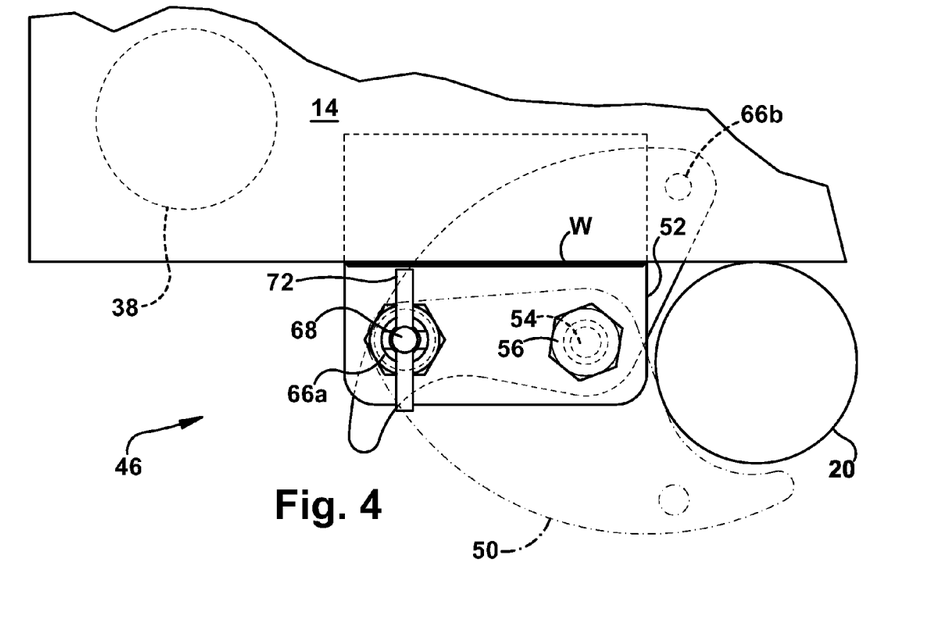
FIG. 4 is a partial-top plan view of one latching arm assembly of the lug cart of FIG. 3 in an unsecured position.
Figure 5:
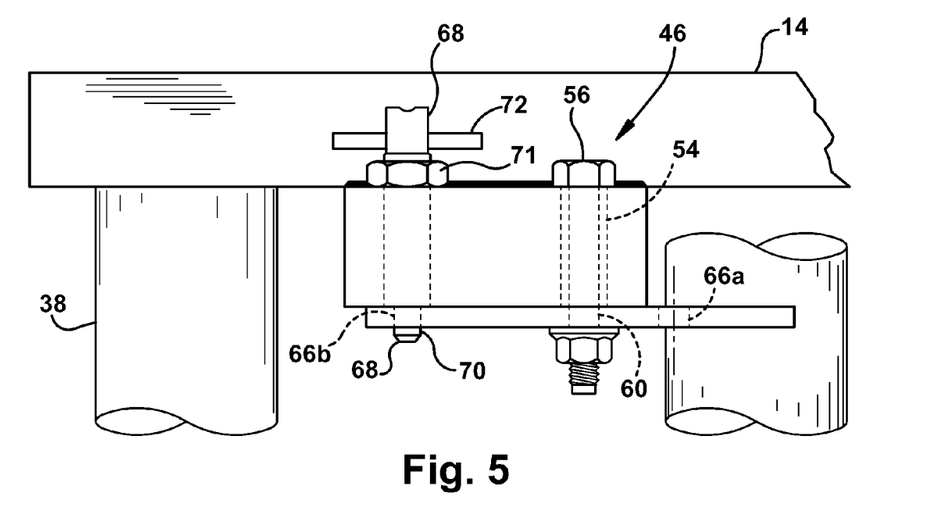
FIG. 5 is a partial-front elevation view of one latching arm assembly of the lug cart of FIG. 3.

The process of obtaining a released position of the lug cart assembly 14 of FIG. 4 from that of the latched or docked position of FIGS. 1-3 and 5-6, requires the operator to pull the locking pin 68 to the unlocked position (U) on one of the of the latching arm assemblies (46) (the one-step release) and rotating the arcuate pivoting arm 50 about the pivoting pin 56. If so desired, the operator can further advance the arcuate pivoting arm 50 so that the latching pin 68 engages locating aperture 66a to secure an unlocked position in the pivoting arm. It should be further mentioned that the pivoting arms 50 can be rotated beyond locating aperture 66a in an unlocked position, allowing the front 55 of the lug cart assembly to be clear from any portion of the pivoting arms 50. Once the pivoting arm of one of the two latching arm assemblies 46 is in the released position described above and shown in FIG. 4, the operator can shift the lug cart 14 laterally (see arrows L in FIGS. 1a and 1b), then pull the cart away longitudinally (see arrow O in FIG. 1) once the remaining secured arcuate pivoting arm 50 clears corresponding secured leg 20 or 22, hence the one-step release process is complete.

Figure 8:
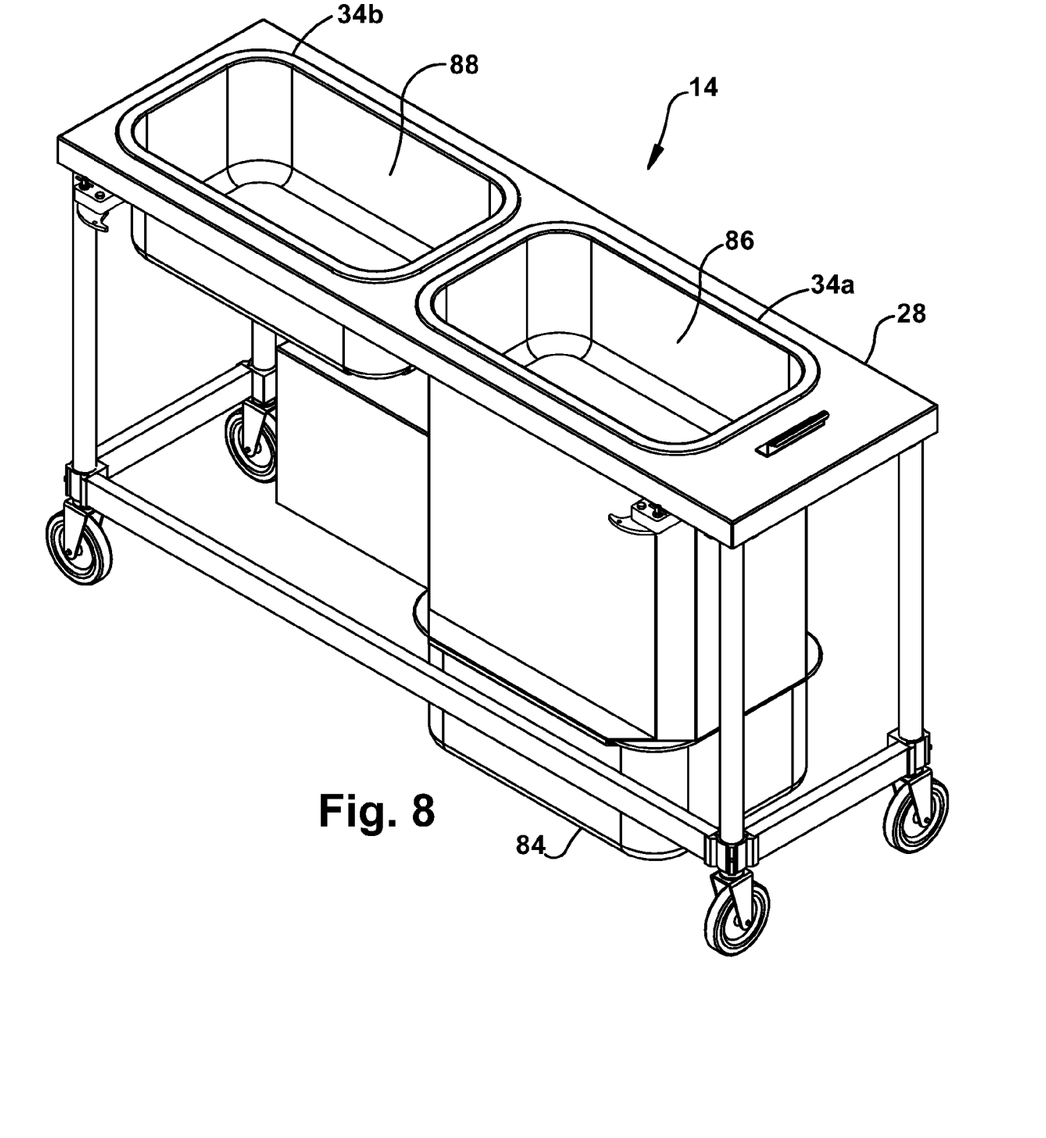
FIG. 8 is a perspective view of a lug cart assembly constructed in accordance with another embodiment of the present disclosure adapted to support a sifter.

Referring now to FIG. 8 is another example embodiment of the present disclosure in which a sifter 84 is located below one (illustrated) or both (not shown) of the lugs 34a and 34b of the lug cart 14. The sifter 84 is used to recycle materials such as flour used during breading operations. In yet another example embodiment, only one lug 34a or 34b is present and a working surface is provided adjacent the lug (not shown). In another example embodiment, covers 86 and 88 are positioned over the top of lugs 34a and 34b lugs.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

We claim:

1. A lug cart and support table assembly comprising:
    a) a support table having an upper support surface for supporting a breading machine;
    b) a lug cart having an operating surface for supporting a lug shaped tub;
    c) a latching system affixed to the lug cart to removably attach the lug cart to a selected one of a front side and a rear side of the table assembly;
    d) in a first position of the lug cart, the lug cart being removably attached by the latching system to a pair of front legs of the support table and, in the second position of the lug cart, the lug cart being removably attached by the latching system to a pair of rear legs of the support table; and
    e) the latching system includes a first latch assembly and a second latch assembly affixed to an end of the cart in spaced apart relation, each of the first and second latch assemblies includes a support body, a pivoting arm coupled to the support body and pivoting in a horizontal plane about a vertical axis between a locking position and a release position, the pivoting arm including first and second openings and an arcuate engagement face to engage a portion of a respective leg of the support table in a locking position, and a locking pin extending through the support body and including a distal end extending beyond the support body and received into a selected one of the first and second openings, the locking pin distal end being received into the first opening of the pivoting arm in the locking position, the locking pin distal end pin distal end being received into the second opening of the pivoting arm in the release position.

2. The lug cart and support table assembly of claim 1 wherein when the first and second latch assemblies are in a locking position, for each of the first and second latch assemblies, an arc, facing in a direction of the support body, defined by a first point of contact between the lug cart and a respective leg of the support table and a second point of contact between the pivoting arm and the respective leg being less than 180 degrees such that if one of the first and second latch assemblies is in the locking position and the other of the first and second latch assemblies is in the release position, the lug cart may detached and moved away from the support table.

3. The lug cart and support table assembly of claim 1 wherein said first latch assembly and said second latch assembly form a mirror image of each other, facilitating a one step release of the cart from the support table assembly while one of said first or second latch assemblies is in the locking position and the other of the first and second latch assemblies is in the release position such that the lug cart may detached and moved away from the support table.

4. The lug cart and support table assembly of claim 1 wherein said support table is constructed for mobility by a caster being fixedly attached to said pairs of front and rear legs.

5. The lug cart and support table assembly of claim 1 wherein said lug cart further comprises a sifter disposed beneath at least one lug in said lug cart.

6. The lug cart assembly of claim 1 wherein said pivoting arm is made from stainless steel.

7. The lug cart and support table assembly of claim 2 wherein said first latch assembly and said second latch assembly form a mirror image of each other, facilitating a one step release of the cart from the support table assembly while one of said first or second latch assemblies is in the locking position and the other of the first and second latch assemblies is in the release position such that the lug cart may detached and moved away from the support table.

8. A lug cart and support table assembly comprising:
    a) a support table having an upper support surface for supporting a breading machine;
    b) a lug cart having an operating surface for supporting a lug shaped tub;
    c) a latching system affixed to the lug cart to removably attach the lug cart to a selected one of a front side and a rear side of the table assembly;
    d) in a first position of the lug cart, the lug cart being removably attached by the latching system to a pair of front legs of the support table and, in the second position of the lug cart, the lug cart being removably attached by the latching system to a pair of rear legs of the support table; and
    e) the latching system includes a first latch assembly and a second latch assembly affixed to an end of the cart in spaced apart relation, each of the first and second latch assemblies includes a support body, a pivoting arm coupled to the support body and pivoting in a horizontal plane about a vertical axis between a locking position and a release position, the pivoting arm including first and second openings and an arcuate engagement face to engage a portion of a respective leg of the support table in a locking position, and a locking pin extending through the support body and including a distal end extending beyond the support body and received into a selected one of the first and second openings, the locking pin distal end being received into the first opening of the pivoting arm in the locking position, the locking pin distal end pin distal end being received into the second opening of the pivoting arm in the release position; and f) the first and second latch assemblies are in a locking position, for each of the first and second latch assemblies, an arc, facing in a direction of the support body, defined by a first point between the lug cart and a respective leg of the support table and a second point between the pivoting arm and the respective leg being less than 180 degrees such that if one of the first and second latch assemblies is in the locking position and the other of the first and second latch assemblies is in the release position, the lug cart may detached and moved away from the support table.

9. The lug cart and support table assembly of claim 8 wherein said first point and said second point simultaneously contact said respective leg when said first or second latching assembly is in a locking position.

10. The lug cart and support table assembly of claim 8 wherein said one of said first point and said second point is in contact said respective leg when said first or second latching assembly is in a locking position.

11. The lug cart and support table assembly of claim 8 wherein said first latch assembly and said second latch assembly form a mirror image of each other, facilitating a one step release of the cart from the support table assembly while one of said first or second latch assemblies is in the locking position and the other of the first and second latch assemblies is in the release position such that the lug cart may detached and moved away from the support table.

12. The lug cart and support table assembly of claim 9 wherein said first latch assembly and said second latch assembly form a mirror image of each other, facilitating a one step release of the cart from the support table assembly while one of said first or second latch assemblies is in the locking position and the other of the first and second latch assemblies is in the release position such that the lug cart may detached and moved away from the support table.

13. The lug cart and support table assembly of claim 10 wherein said first latch assembly and said second latch assembly form a mirror image of each other, facilitating a one step release of the cart from the support table assembly while one of said first or second latch assemblies is in the locking position and the other of the first and second latch assemblies is in the release position such that the lug cart may detached and moved away from the support table.

14. A lug cart and support table assembly comprising:
a) a support table having an upper support surface for supporting a food processing machine;
b) a lug cart having an operating surface for supporting a lug shaped tub;
c) a latching system affixed to the lug cart to removably attach the lug cart to a selected one of a front side and a rear side of the table assembly;
d) in a first position of the lug cart, the lug cart being removably attached by the latching system to a pair of front legs of the support table and, in the second position of the lug cart, the lug cart being removably attached by the latching system to a pair of rear legs of the support table; and
e) the latching system includes a first latch assembly and a second latch assembly affixed to an end of the cart in spaced apart relation, each of the first and second latch assemblies includes a support body, a pivoting arm coupled to the support body and pivoting in a horizontal plane about a vertical axis between a locking position and a release position, the pivoting arm including first and second openings and an arcuate engagement face to engage a portion of a respective leg of the support table in a locking position, and a locking pin extending through the support body and including a distal end extending beyond the support body and received into a selected one of the first and second openings, the locking pin distal end being received into the first opening of the pivoting arm in the locking position, the locking pin distal end pin distal end being received into the second opening of the pivoting arm in the release position; and
f) first latch assembly and said second latch assembly form a mirror image of each other, facilitating a one step release of the cart from the support table assembly while one of said first or second latch assemblies is in the locking position and the other of the first and second latch assemblies is in the release position such that the lug cart may detached and moved away from the support table.

15. The lug cart and support table assembly of claim 14 wherein said first point and said second point simultaneously contact said respective leg when said first or second latching assembly is in a locking position.

16. The lug cart and support table assembly of claim 14 wherein said one of said first point and said second point is in contact said respective leg when said first or second latching assembly is in a locking position.

* * * * *